United States Patent [19]

Sawyer

[11] Patent Number: 5,351,056
[45] Date of Patent: Sep. 27, 1994

[54] TARGET TRACKING IN CLUTTER DEGRADED SCENES USING CENTRAL LEVEL STEREO PROCESSING

[75] Inventor: Joseph C. Sawyer, Boulder, Colo.

[73] Assignee: International Business Machines Corp., Armonk, N.Y.

[21] Appl. No.: 80,800

[22] Filed: Jun. 21, 1993

[51] Int. Cl.⁵ .......................... G01S 5/02; G01S 5/12; H04B 7/185

[52] U.S. Cl. .................... 342/195; 342/126; 342/357; 342/463

[58] Field of Search ................. 342/59, 73, 95, 97, 342/126, 189, 195, 357, 463

[56] References Cited

U.S. PATENT DOCUMENTS

| | | | |
|---|---|---|---|
| 4,104,631 | 8/1978 | Weigle et al. | 342/94 |
| 4,559,537 | 12/1985 | Pearson, Jr. et al. | 342/99 |
| 5,105,198 | 4/1992 | Inamiya | 342/457 |
| 5,111,209 | 5/1992 | Toriyama | 342/357 |
| 5,119,101 | 6/1992 | Barnard | 342/357 |
| 5,294,930 | 3/1994 | Li | 342/13 |

*Primary Examiner*—John B. Sotomayor
*Attorney, Agent, or Firm*—Lauren Bruzzone; David A. Mims, Jr.

[57] ABSTRACT

A computer method is disclosed for extracting data on a target from a clutter degraded environment by using non-time-synchronized results from two sensors stations. The method, which is employed in satellite tracking systems, transforming multiple non-synchronous sensor returns comprised of angles from line of sight observations from passive sensors into target position coordinates. Observations from successive returns of each sensor are paired and a triangulation point is calculated. Successive triangulation points are used to determine points on the projected trajectory of the target. These calculated target position coordinates may then used to project the future path of the target.

9 Claims, 4 Drawing Sheets

NON-TIME-SYNCHRONIZED RETURNS TRIANGULATION GEOMETRY

Where:
 $Ra_i$ is the return received by sensor a at time i
 $Rb_k$ is the return received by sensor b at time k

TARGET TRACKING IN CLUTTER DEGRADED SCENES USING CENTRAL LEVEL STEREO PROCESSING

FIELD OF THE INVENTION

The invention disclosed broadly relates to data processing systems and methods and, more particularly, relates to an improved method for target tracking. The invention provides for extracting data on a target from a clutter degraded environment by using non-time-synchronized results from two sensors stations.

BACKGROUND OF THE INVENTION

Target tracking is the process of calculating the path or track of a moving object by monitoring its current position and using the data obtained from this monitoring to project its future position. An example of target tracking is the process of air traffic control where radar stations send out signals and receive back reflections (referred to as hits) from on-coming planes (targets), thereby determining the flight path (track) of the plane. The radar stations are referred to as active sensors since they originate the signals. Target tracking can also be performed using passive sensors. In this type of tracking, the sensors receive signals (referred to as results or returns) sent out by the targets to be tracked. Satellite observation sensors, which sense infrared rays, are a common example of passive sensors.

In many practical applications, signals may be reflected back (or sent out from) objects other than the target being tracked. For example, if the target is an extremely low flying plane, signals may be reflected back from objects on the ground. In the case of orbital satellites, there may be other heat sources in the area in addition to the target tracked. These spurious reflections or returns from other than the tracked target are referred to as "clutter." It is a known problem in the art to distinguish clutter from valid hits. Clearly, if the clutter is erroneously believed to be valid data, that is, reflections from the tracked target, and input into the process used to project the target's future position, the projected results could diverge significantly from the actual path of the target.

It was known in the prior art that clutter could sometimes be distinguished from the target data by analyzing the signals from multiple stations. In practice, however, it was rare than there were enough stations in the proper position to provide the required cross triangulations. Other methods, useful if Doppler radar was used in tracking, relied on the Doppler shift frequency to track targets in the presence of clutter. (See, for example, Method of Tracking Target in Presence of Clutter, U.S. Pat. No. 4,559,537, E.C. Pearson, et al.)

Neither of these approaches was useful, however, in a situation in which the tracking was done by satellites. In the prior art, satellite tracking was done primarily by line of sight observations taken simultaneously from two satellites. FIG. 1 illustrates this approach. In the diagram, two satellites, A and B, simultaneously scan target T. The "return" or data received by the satellite is comprised of the infrared waves given off by target T. On a simplistic level, each satellite receives data comprised of the angle formed by some arbitrary base line (generally, the line which extends from the center of the Earth (C) to satellite) and the tracked object. For example, in FIG. 1, satellite A's data is comprised of angle 1 and satellite B's data is comprised of angle 2. Thus, the position of target T can be calculated by calculating the intersection point of the two simultaneous lines of sight observations (with angles 1 and 2) from the satellites.

Since the total cost of the satellite, its launch and its ground station are significant, the number of satellite observation bases available for any given application is relatively few. Thus, an approach which relies on multiple observations from multiple sensors to distinguish clutter is not, generally, viable. Since satellites are, generally, passive sensors with relatively long time lags between observations or scans (of the order of 10 seconds or more), using multiple observations from the same satellite was not viable. By the same token, Doppler shift analysis was generally not applicable in the passive sensor environment.

OBJECTS OF THE INVENTION

Accordingly, it is an object of this invention to provide an improved method of target tracking.

It is a another object of this invention to provide an improved method of target tracking from satellites, where the method accurately discriminates valid from invalid sensor results in a "cluttered" environment.

It is a further object of this invention to provide an such an improved method of target tracking using non-simultaneous results received from two sensor stations where the results are expressed only as angle data.

It is a further object of this invention to provide a method of target tracking in which the target's position may be determined using relatively few observations, thus providing an improved method in a situation in which the time between observations is relatively long.

SUMMARY OF THE INVENTION

These and other objects, features and advantages are accomplished by the invention disclosed herein.

A computer method is disclosed for accurately transforming multiple non-synchronous sensor returns (or results) from two sensor stations into a projected trajectory for a specific target. The method involves a transformation of angles of lines-of-sight into target position coordinates. The calculated target position coordinates are then used as input into well-known algorithms to project the future path of the target.

The invention is employed in a satellite traffic system, including two satellite sensor stations, orbiting the Earth. The satellites are operatively connected to an station on the surface of the Earth comprising a data processing system for performing the required transformations and projections. The method is comprised of receiving series of line-of-sight results or observations from the two satellites. An observation from the first of these satellites is triangulated with an observation from the second of the satellites, where the observations are selected so that one immediately succeeds the other in time. The point calculated from this triangulation is associated with a second triangulation point which is spatially proximate to the first. The vector between the two points is used to determine a point on the trajectory. This transformation is performed iteratively with the successive observations from the two satellites, resulting in a series of points on the target's trajectory. This series may be used to project to future position of the target using well known algorithms.

DESCRIPTION OF THE DRAWINGS

Other objects and advantages of this invention will be more readily appreciated and the invention will, at the same time, become better understood by reference to the following drawings, wherein.

DESCRIPTION OF THE PREFERRED EMBODIMENT

The invention provides for target tracking by triangulating non-time-synchronized returns from two passive sensors.

As previously mentioned, the invention is employed in a satellite tracking system which includes two satellite sensor stations, orbiting the Earth. The satellites transmit the data they receive to an Earth station comprised of a data processing system. The data processing system executes a computer program to yield the x,y,z-coordinates of the target. These coordinates may be displayed on a display for viewing (either as a two dimensional projection of the three-dimensional coordinates, as a table, or in some other fashion). Alternately, these coordinates may be used as the basis for further processing.

Figure 1:
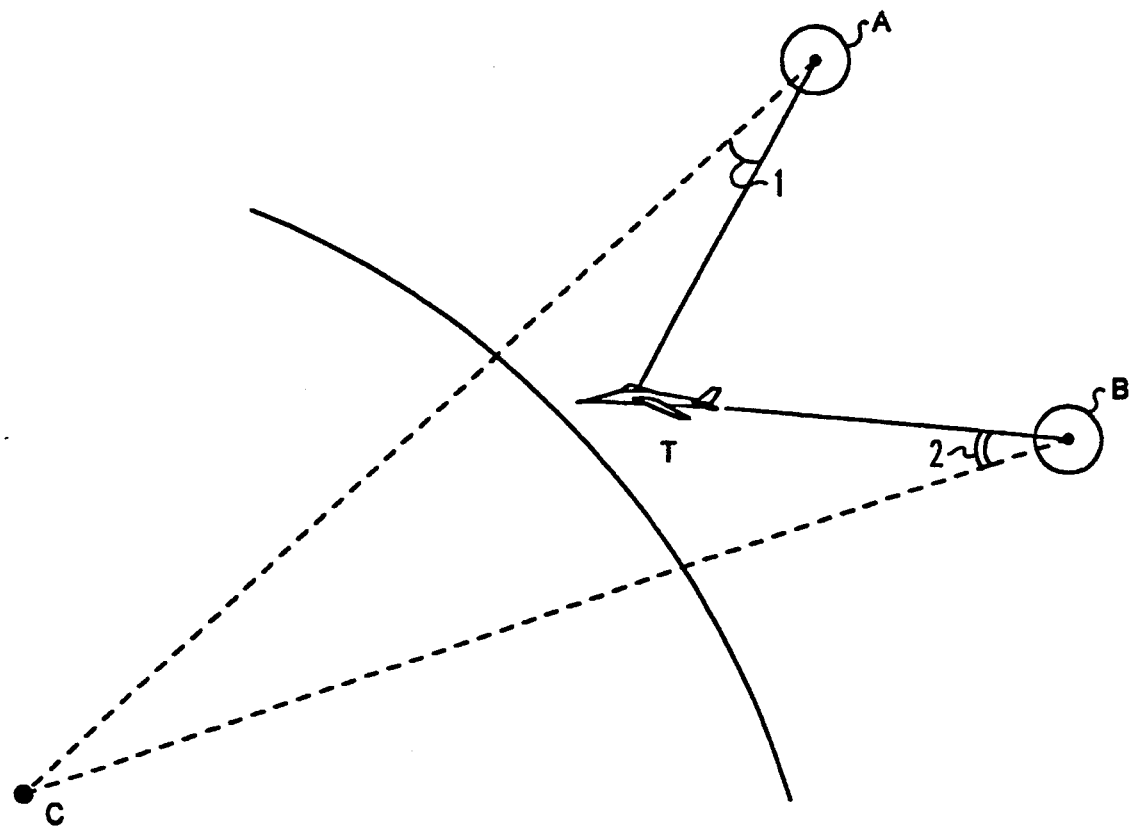
FIG. 1 is a simplistic representation of the prior art in which two satellites use simultaneous results to determine the position of a target.
Figure 2:
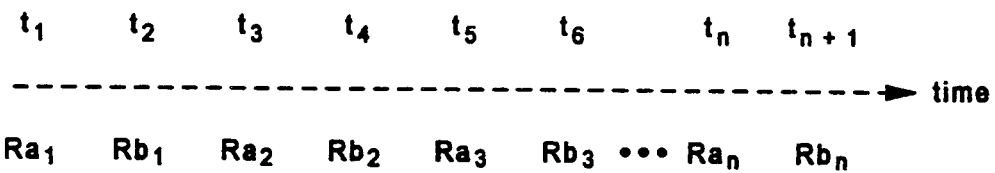
FIG. 2 represents a time line against which is graphed to returns received by sensors a and b.

The method in accordance with the invention is as follows. A pair of orbiting satellite sensor stations (sensors) is used to track the target. Each sensor receives infrared signals from a specified target area on a periodic basis. The period of reception is referred to as a scan or scan cycle. The received signals are referred to as a return or result. The scan cycles of the two sensors are non-time-synchronized. That is, sensor A receives its returns at a different series of time points than sensor B. FIG. 2 is a representation of a time line against which is graphed the successive sensor returns, where the return received by sensor a at time n is indicated by $Ra_n$ and the return received by sensor b at time m is indicated by $D)_m$.

Figure 3:
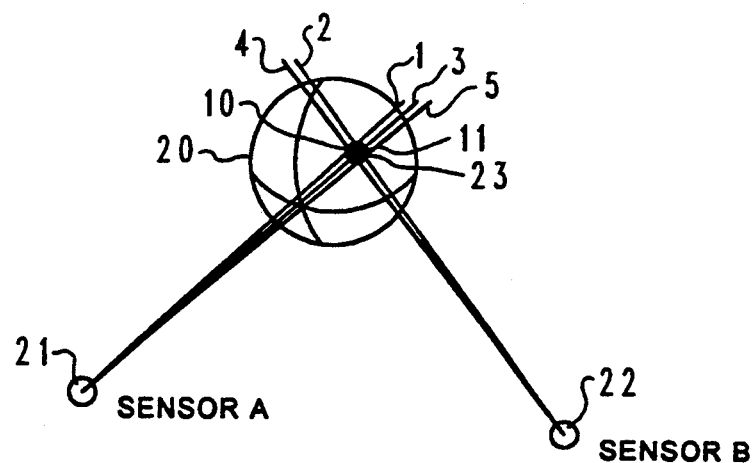
FIG. 3 is a global view illustrating two sensors tracking a moving target.

The invention may be more easily understood by referring to a drawing. Referring to FIG. 3, a target T moving across the face of the earth (20) is following the trajectory 10-11. Two satellites, sensor A (21) and sensor B (22) are tracking the target T (23). In the Figure, Sensor A has detected the target in three successive scan periods, resulting in tracking data consisting of the angle determined by the lines 1, 3 and 5 respectively. Sensor B had detected the same target in two intervening scan periods, resulting in tracking data consisting of the angle determined by the lines 2 and 4 respectively. The time sequence in which the scan results are received is given by: 1, 2, 3, 4, and 5.

Figure 6:
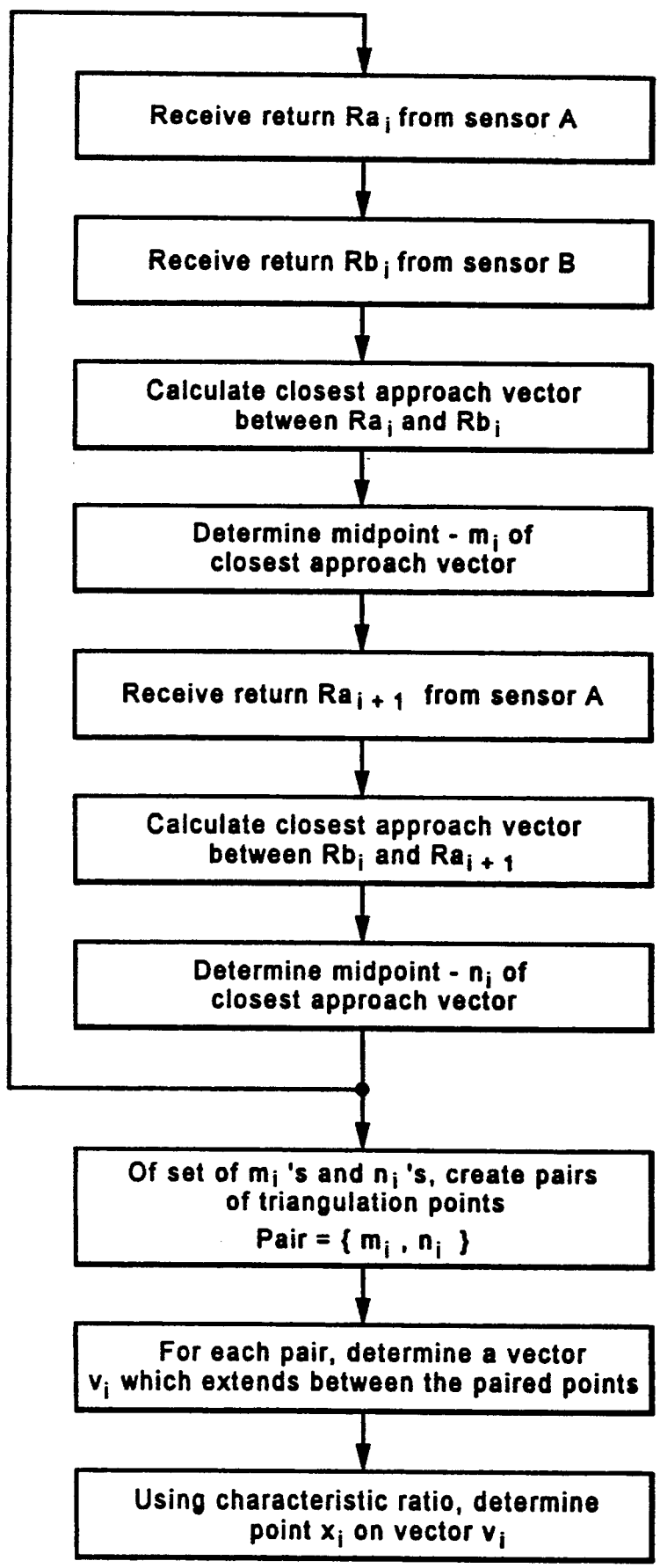
FIG. 6 is a flow diagram for the method of the invention.

The method for calculating the track of a target in a data processing system in accordance with the invention is described in the flow diagram of FIG. 6. The details of each step in the flow diagram of FIG. 6 are given in Table 1. All references to "step n" refer to Table 1.

Accordingly, in step 1, as the returns (data) from a scan are received from one sensor, it is combined with the data most recently received from the other sensor. Thus, each result received by one of the sensors is triangulated with earlier and later results from the other sensor. Generically, using the nomenclature developed for FIG. 2, $D_1$ is triangulated with $Ra_1$ and also with $Ra_2$. $Ra_3$ is triangulated with $D_3$ and also with $D_2$. More generally, $D_k$ is triangulated with $Ba_k$ and $Ra_{k+1}$, while $Ra_i$ is triangulated with $Di_{i-1}$ and $D_i$. With reference to the specific example illustrated by FIG. 3, 1 is triangulated with 2, 2 is triangulated with 3, 3 is triangulated with 4, etc.

Figure 4:
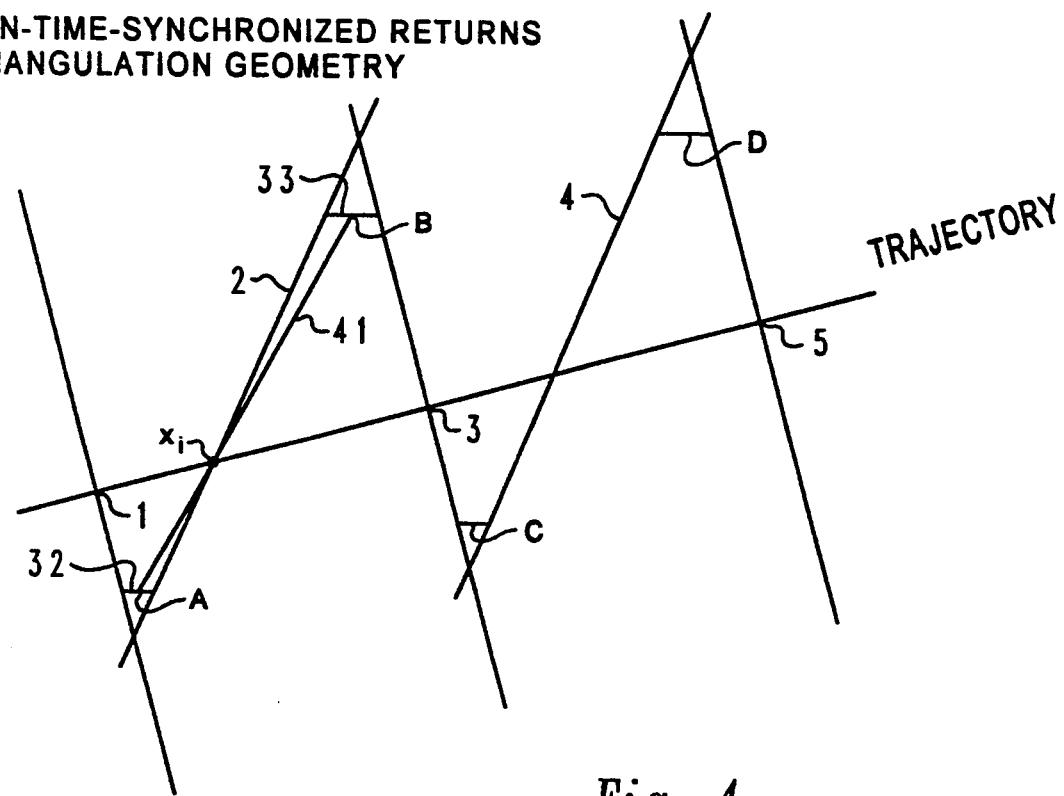
FIG. 4 is a two dimensional projection of the triangulation points obtained from the operation of the sensors shown in FIG. 1.

FIG. 4 is a two-dimensional projection of the received tracking data. The tracking results from the three successive scan periods of sensor A is shown by lines 1, 3 and 5. It will be noted that the lines are, in fact, not parallel, since they meet at the sensor A. However, since in the preferred embodiment, the distances from target to sensor are great, lines 1, 3 and 5 would appear to be almost parallel. The tracking data from the two successive scan period so sensor B is shown by lines 2 and 4. Again, line 2 would not be actually parallel to line 4, but appears so because of the distance to the sensor B.

Figure 5:
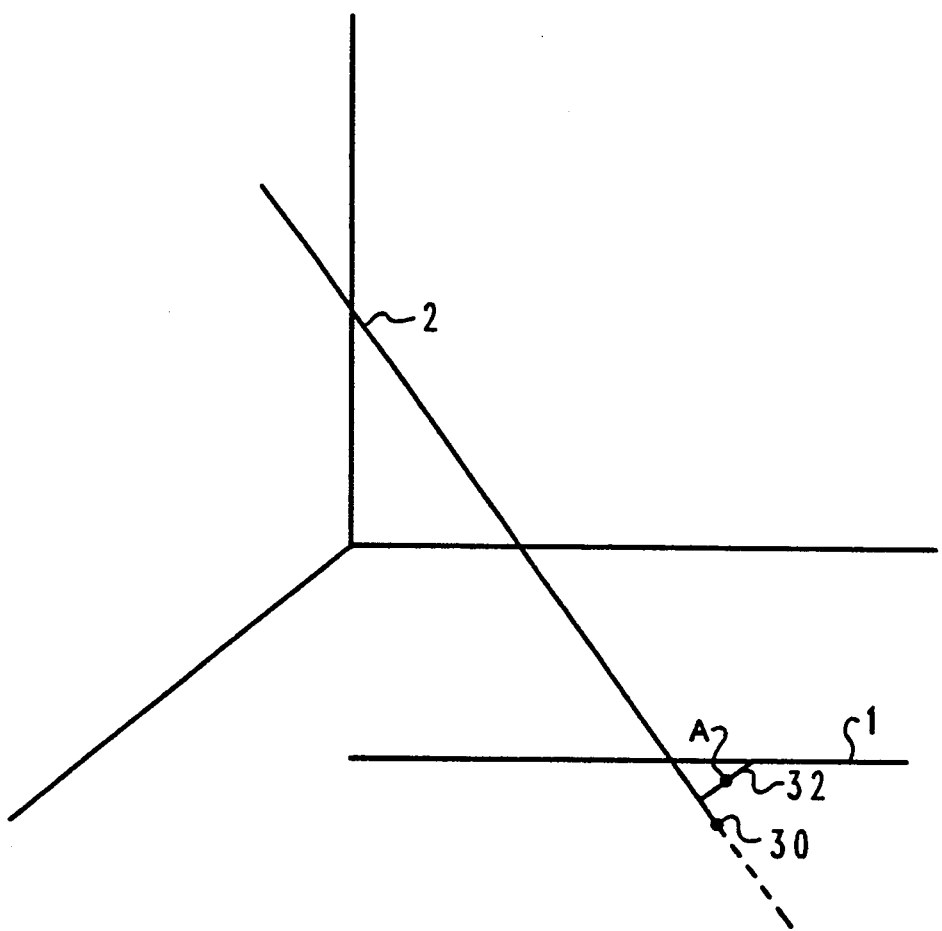
FIG. 5 is a representation in x-y-z coordinate space of a detail portion of FIG. 3.

As has been mentioned, FIG. 4 is a two-dimensional projection of the received tracking data. In actuality, since sensor A and sensor B are not in the same plane, and the scans from each sensor are not time synchronized, lines 1, 3 and 5 do not necessarily cross lines 2 and 4. FIG. 5 is an illustration of the spacial relationship of lines 1 and 2. In FIG. 5, line 1 lies in the x-y plane (shaded). Line 2 intersects the x-y plane at point 30. Thus, lines 1 and 2 never intersect.

In step 2 of the method of the invention, the shortest distance between the two selected sensor results is calculated. The line segment 32 in FIG. 5 represents the shortest distance between the lines 1 and 2. Line 32 is referred to as the closest approach vector (or coplanarity residual). Point A is the midpoint of the closest approach vector 32. Point A will be used as the triangulated position determined by triangulating the first return from sensor A with the first return from sensor B. The two dimensional projection of line segment 32 and point A is shown in FIG. 4.

Step 4 consists of an iteration of the previous steps. That is, in the current example, continuing to refer to FIG. 4, point B is the triangulated position determined by triangulating the second return from sensor A (represented by line 3) with the first return from sensor B (represented by line 2). Point B is the midpoint of the closest approach vector 33. Similarly, point C is the result of triangulating the second return of sensor A with the second return of sensor B and point D is the result of triangulating the second return of sensor B with the third return of sensor A.

The result of the analysis so far is a string of triangulated points: A, B, C and D, generated by triangulating data from successive scan periods.

The next step (Step 5) in the analysis is the association of pairs of these triangulated points. Data association is performed by selecting as a pair, those triangulated points which were determined using one common return or result. Thus, referring to FIG. 4, the point A, which is the result of triangulation from the first return from sensor A and the first return from sensor B, is associated with point B, which is the result of triangulation from the first return from sensor B and the second return from sensor A. The common return of A and B is, clearly, the first return from sensor B. By analogous reasoning, point B is associated with point C (the common return being the second return from sensor A), point C is associated with point D (the common return being the second return from sensor B).

In Step 6, the vector that extends from point A and to point B is determined (line 41 in FIG. 4).

Line 41 will intersect the trajectory of the target at a point determined by the fixed constant which is determined by the geometry of the three dimensional pyramid-like forms created by the various lines. This constant will be referred to as characteristic ratio. Step 7 consists of determining the point lying on the trajectory. That is, Step 7 is comprised of determining the point X on line 41 where the ratio of the distance from X to A and the distance from X to B equals the characteristic ratio.

The characteristic ratio for a target which is assumed to have a constant is defined as the ratio of the time delta that elapses between return 1 and return 2 and the time delta that elapses between return 2 and return 3. Returning to FIG. 2, if $Ra_1$ is return 1, $D_1$ is return 2, etc., then the characteristic ratio would be:

$$\frac{t_1 - t_2}{t_2 - t_3} \tag{1}$$

Step 8 is comprised of repeating steps 1 through 7, iteratively resulting in a sequence of points $x_i$, each lying on the trajectory. Using algorithms well known in the prior art, one can project the trajectory of the target from this sequence of points. Similarly, from the sequence of points $x_i$, one can calculate the acceleration of the target.

Intersensor bias

The geometry in FIG. 4 indicates zero intersensor bias. That is, FIG. 4 assumes that neither sensor is subject to errors in that the attitude determination of both sensors have no lags—the angle each sensor records is in fact the angle of the received result. In actuality, it is more common for one or both of the sensors to have a bias. If any vertical bias does exist, then it would be reflected in the calculations of the closest approach vectors. (Note that horizontal bias would not be observable.) The magnitudes of the closest approach vectors of two associated triangulated points should be in a ratio to each other that matches the characteristic ratio. If this is not the case, then a bias can be calculated that would produce the characteristic ratio from the observed vector by determining the difference of the ratios. More specifically, the bias can be compensated for by using factors which correct it to the characteristic ratio by calculating the constants that must be added to the numerator and denominator of the ratio of the closest approach vector magnitudes to produce the characteristic ratio.

In other words if the characteristic ratio were:

$$\frac{t_1 - t_2}{t_2 - t_3} = \frac{\Delta t_1}{\Delta t_2} \tag{2}$$

then the vertical bias is given by:

$$\frac{CVMag_1 \times \Delta t_2 + CVMag_2 \times \Delta t_1}{\Delta t_1 + \Delta t_2} \tag{3}$$

where CV $Mag_i$ is the magnitude of the ith closest approach vector.

Clutter Identification

If the vertical bias is known (i.e. if the vertical bias was determined by observation of a fixed source at a known location), the calculated bias may be used as an immediate error indicator. More precisely, if the calculated bias associated with a calculated target track point differed from the known vertical bias, than that calculated point would actually be clutter.

Alternatively, if the vertical bias is not known, those strings of associated points which indicate inconsistent biases may be discarded as clutter.

Velocity

This method can also be used to determine the velocity. After two measurements are received from each of sensors A and B, then the velocity is calculated as the distance from point A to point C divided by the associated time delta. Specifically, if the two measurements from sensor A occur at time $t_1$ and $t_3$ while the two measurements from sensor B occur at times $t_2$ and $t_4$ then, the associated time delta is given by:

$$\frac{(t_4 - t_2) + (t_3 - t_1)}{2} \tag{4}$$

Distinctions and Advantages

The position of point A in FIG. 3 illustrates a significant difference that results from the fact that the returns are not time-synchronized. In the prior art, the use of time synchronized returns in triangulation resulted in an intersection point that lay on the path of the trajectory. As illustrated by the prior discussion, non-time-synchronized triangulations do not lie on the trajectory. Rather, sequential triangulations lie on alternate sides of the trajectory and the vectors connecting one triangulation point with its associated point intersect that trajectory, with the intersection point determined by the characteristic ratio.

Other differences between this invention and the prior art provide significant advantages to the user. For example, the invention enables a determination of the target's position on the basis of data from three scans. This is important in situations in which the sensors have relatively long time lags between scans.

Another advantage provided by this invention is that the technique of associating triangulation points (by pairing those derived from a common sensor return) obviates the need for any additional spacial test or information to determine how points should be paired.

Another difference in this advantage, which results in significantly less processing, is that clutter is identified and discarded as an integral part of the method, rather than requiring additional steps.

Still another advantage is that, if the bias between the sensors is available (say through measurements of an object whose position is know), then the known bias may be used to distinguish clutter. On the other hand, if the bias is not known, the invention may determine target position by using a consistent or relative bias.

With regard to the flow diagram of FIG. 6 and its detail in Table I, it is within the scope of the invention that the order of the steps can be altered, or other steps added, without changing the fundamental nature of the invention.

Although a specific embodiment of the invention has been disclosed, it will be understood by those having skill in the art, that changes can be made to the specific embodiment without departing from the spirit and scope of the invention. Such changes include, but are not limited to, performing the processing on-board one of the satellite sensors, extending the above method with non-synchronized data from more than two satellites, using two satellites in the same plane, and using active rather than passive sensors.

TABLE 1

Step 1: Combine data received from a first sensor with the data most recently received from a second sensor, the data from the second sensor being chosen in that it is the data received from the second sensor most close in time to the data received from the first sensor. That is, $Ra_i$ is conjoined with $Rb_i$.

Step 2: Calculate the closest approach vector between $Ra_i$ and $Rb_i$.

Step 3: Determine the midpoint of the closest approach vector, $m_i$

Step 4: Repeat steps 1 through 3 for the data received from the second sensor. That is, $Rb_i$ is combined with $Ra_{i+1}$ and the midpoint $n_i$ of the resulting closest approach vector is determined.

Step 5: Data association is performed by selecting as a pair, those triangulated points which were determined using one common return or result. Since $m_i$ and $n_i$ have in common $Rb_i$, associate $m_i$ and $n_i$.

Step 6: Determine the vector $v_i$ which extends from $m_i$ to $n_i$

Step 7: Using the characteristic ratio, C, determine a point on the vector $v_i$ which lies on the target's trajectory. This point, $x_i$, is determined such that:

$$\frac{\text{distance } x_i \rightarrow m_i}{\text{distance } x_i \rightarrow n_i} = C$$

Step 8: Repeat steps 1 through 7, iteratively, resulting in a sequence of points $x_j$, each lying on the trajectory. Using algorithms well known in the prior art, project the trajectory of the target from this sequence of points.

What is claimed is:

1. In a target tracking system, including a first tracking station and a second tracking station, said first tracking station and said second tracking station operatively connected to a data processing system, a computer method for determining the track of a target comprising the steps of:
   (a) receiving at said first tracking station a first return, said first return comprised of first angle measurement of the position of a target as observed from said first tracking station, said first return being received at a first point in time;
   (b) receiving at said second tracking station a second return, said second return comprised of second angle measurement of the position of said target as observed from said second tracking station, said second return being received at a second point in time, said second point in time being later than said first point in time;
   (c) receiving at said first tracking station a third return, said third return comprised of third angle measurement of the position of said target as observed from said first tracking station, said third return being received at a third point in time, said third point in time being later than said second point in time;
   (d) receiving at said second tracking station a fourth return, said fourth return comprised of fourth angle measurement of the position of said target as observed from said second tracking station, said fourth return being received at a fourth point in time, said fourth point in time being later than said third point in time;
   (e) calculating a first point by triangulating between said first return and said second return;
   (f) calculating a second point by triangulating between said second return and said third return;
   (g) calculating a third point by triangulating between said third return and said fourth return;
   (h) associating said first point and said second point on the basis that said first point and said second point were each calculated using said second return;
   (i) associating said second point and said third point on the basis that said second point and said third point were each calculated using said third return;
   (j) determining a first vector whose end points are said first point and said second point;
   (k) determining a second vector whose end points are said second point and said third point;
   (l) determining a first track point, said first track point being the point on said first vector such that ratio between the distance from said first track point to said first point and the distance from said first track point to said second point is equal to a characteristic ratio; and
   (m) determining a second track point, said second track point being the point on said second vector such that ratio between the distance from said second track point to said second point and the distance from said second track point to said third point is equal to said characteristic ratio.

2. A method as in claim 1 wherein said calculation by triangulation of said first point is comprised of the steps of:
   (a) determining a first closest approach vector between said first return and said second return, said first closest approach vector comprised of the shortest vector connecting said first return to said second return; and
   (b) using as said first point said first closest approach vector's midpoint.

3. A method as in claim 1 wherein said characteristic ratio is the ratio of a first time interval and a second time interval, said first time interval comprised of the time difference between said first point in time and said second point in time, and said second time interval comprised of the time difference between said second point in time and said third point in time.

4. A method as in claim 1 wherein said first track point and said second track point are used to calculate a projected trajectory of said target.

5. A method as in claim 1 wherein said target's velocity is calculated by dividing the distance between said first point and said second point by the difference between said first point in time and said second point in time.

6. A method as in claim 1 wherein a vertical bias between said first tracking station and said second tracking station is determined by comparing the ratio of the length of said first vector to the length of said second vector to said characteristic ratio.

7. A method as in claim 6 wherein if a clutter point if said determined vertical bias is not equal to a known vertical bias, then said first track point is identified as a clutter point.

8. A method as in claim 1 wherein said first and said second tracking stations comprise a first and second satellite in orbit around the Earth.

9. A target tracking system for determining a track of a target, said target tracking system including a first tracking station and a second tracking station, said first tracking station and said second tracking station operatively connected to a data processing system, said system comprising:

(a) means for receiving at said first tracking station, first-station-return-measurements, said first-station-return-measurements comprised of angle measurement of the position of a target as observed from said first tracking station, each of said first-station-return-measurements being received at an associated point in time, said collection of said associated points in time comprising a first set;

(b) means for receiving at said second tracking station, second-station-return-measurements, said second-station-return-measurements comprised of angle measurement of the position of a target as observed from said first tracking station, each of said second-station-return-measurements being received at an associated point in time which is 1) different than any of said points in time of said first set and which 2) lies, in time sequence, between two points in time of said first set;

(c) means for calculating a triangulation point from a first first-station-return-measurement and a first second-station-return-measurement, said first second-station-return-measurement having an associated point in time which immediately follows said associated point in time of said first first-station-return- measurement;

(d) means for calculating a vector between pairs of said triangulation points; and (e) means for determining a track point on said vector, where the ratio of distance of said track point from a first end of said vector to the distance of said track point to a second end of said vector is a characteristic ratio.

* * * * *